United States Patent
Keisala

(10) Patent No.: US 9,215,594 B2
(45) Date of Patent: Dec. 15, 2015

(54) SUBSCRIBER DATA MANAGEMENT

(71) Applicant: TELIASONERA AB, Stockholm (SE)

(72) Inventor: Ilkka Keisala, Espoo (FI)

(73) Assignee: TELIASONERA AB, Stockholm (SE)

( * ) Notice: Subject to any disclaimer, the term of this patent is extended or adjusted under 35 U.S.C. 154(b) by 0 days.

(21) Appl. No.: 14/261,748

(22) Filed: Apr. 25, 2014

(65) Prior Publication Data

US 2014/0323090 A1    Oct. 30, 2014

(30) Foreign Application Priority Data

Apr. 26, 2013   (EP) .................................. 13165528

(51) Int. Cl.
*H04W 12/06*  (2009.01)
*H04W 8/18*   (2009.01)
*H04W 8/20*   (2009.01)

(52) U.S. Cl.
CPC .............. *H04W 12/06* (2013.01); *H04W 8/18* (2013.01); *H04W 8/20* (2013.01)

(58) Field of Classification Search
CPC ......... H04W 8/18; H04W 12/06; H04W 8/20; H04L 67/10; H04L 41/0803
USPC ............... 455/411, 432.3, 414.3, 414.1, 466; 709/203, 220; 705/14.1; 370/352
See application file for complete search history.

(56) References Cited

U.S. PATENT DOCUMENTS

| 7,239,877 | B2 | 7/2007 | Corneille et al. |
| 8,315,198 | B2 | 11/2012 | Corneille et al. |
| 2005/0075115 | A1 | 4/2005 | Corneille et al. |
| 2008/0025243 | A1 | 1/2008 | Corneille et al. |
| 2008/0207167 | A1 | 8/2008 | Bugenhagen |
| 2008/0207181 | A1* | 8/2008 | Jiang ........................ 455/414.1 |
| 2011/0195710 | A1* | 8/2011 | Nas et al. .................. 455/432.3 |

FOREIGN PATENT DOCUMENTS

| EP | 1 331 833 | 7/2003 |
| EP | 1 522 922 | 4/2005 |
| EP | 1 580 936 | 9/2005 |
| WO | 03/061236 | 7/2003 |

OTHER PUBLICATIONS

European Search Report dated Sep. 20, 2013, corresponding to the Foreign Priority Application No. 13 16 5528.

* cited by examiner

*Primary Examiner* — Phuoc H Doan
(74) *Attorney, Agent, or Firm* — Young & Thompson

(57) ABSTRACT

A method for retrieving an identifier from a register residing in a mobile communication network, wherein the identifier is mobile subscription specific includes steps of recognizing a modification of information relating to a mobile subscription in a database; determining if the identifier with respect to the mobile subscription, whose information was modified, is missing; performing a query, in response to the determination of missing identifier, towards the register residing in the mobile communication network to request the missing identifier; receiving the missing identifier from the register; delivering the received missing identifier to the database for storing in a context of the mobile subscription. A network node and a system executing the method are also described.

17 Claims, 2 Drawing Sheets

| | IMSI | SERVICE1 | SERVICE2 | SERVICE3 | ... | SERVICEn |
|---|---|---|---|---|---|---|
| MSISDN1 | IMSI1 | + | + | - | ... | + |
| MSISDN2 | - | + | + | + | ... | + |
| MSISDN3 | IMSI3 | - | - | + | ... | + |
| ... | ... | ... | ... | ... | ... | ... |
| MSISDNn | IMSIn | + | - | + | ... | + |

SUBSCRIBER DATA MANAGEMENT

TECHNICAL FIELD

The invention concerns in general the technical field of management of subscriber related information in a network. Especially the invention concerns management of authentication data relating to mobile subscriptions.

BACKGROUND OF THE INVENTION

In wireless communication systems users are offered multiple types of services into which users may access with their mobile terminals. The access to a specific service may be limited with some authentication method, such as requesting user name and/or password. Mobile communication network also provide some means for authentication. Namely, mobile subscriber's public identity is typically so called MSISDN (Mobile Subscriber ISDN Number), which is a number uniquely identifying the subscription in the mobile network, such as a GSM or a UMTS. If one wants to establish a communication channel with a mobile terminal residing in a telecommunication network, the MSISDN of the recipient is used as a destination address, i.e. a telephone number, in order to achieve the network to perform predetermined procedures in establishing the communication channel between the parties of the communication.

Another important identifier as regards to a subscription is so called IMSI (International Mobile Subscriber Identity). IMSI, in turn, is a unique identifier associated to a SIM (Subscriber Identity Module) card. SIM card stores the IMSI information and the related key for identifying and authenticating subscribers in the network. The IMSI information is sent in some contexts by the mobile terminal to the network and it is used for acquiring other details, such as a location, relating to the subscriber from some network elements, such as HLR (Home Location Register) or VLR (Visitor Location Register). An IMSI is usually presented as a 15 digit long number, but it can also be shorter.

Both the MSISDN and IMSI can also be used either alone or in combination with some other credentials for authentication in different services offered by mobile operators. An example of such a service is a Wi-Fi access in a certain location. The authentication for the Wi-Fi network can be performed by utilizing mobile telecommunication network authentication, such as MSISDN or IMSI.

The management of services relating to mobile subscriptions is traditionally performed by telecom operators. In other words, a user or the owner of the subscription, such as an enterprise, has informed the operator on the services to be available for the subscription in question. On the basis of the information received from the owner of the subscription the operator has set rights in a database on services into which the subscriber is entitled to. However, the trend has lately been that the telecom operators have enabled the management of mobile subscriptions to the enterprise customers in order to provide flexible control of services directly by the enterprise representatives, such as IT personnel. This is achieved by providing a specific tool for the enterprise customers by means of which the mobile subscriptions can be managed. In practice the tool is a software application accessible by the enterprise customer so that they are capable of managing the subscriptions of their own users. For security reasons the enterprise customers can manage the subscriptions on a basis of MSISDN, but not with IMSI, since IMSI is not commonly available in the network. On the other hand, the management of the mobile subscriptions is much clearer with MSISDN than with IMSI, since IMSI as such is not anyhow linked into the real world as the MSISDN is as a phone number. Information on the modifications made in the subscriptions is conveyed to operator's database with MSISDN information.

The arrangement as described above brings some challenges as regards to the identity of a subscriber in the network. Namely, with respect to some services the identity of a subscriber used in the network is IMSI. Now, if the modifications made into a subscription and transferred to the operator database only contain the MSISDN information it may happen that the user i.e. the subscription, cannot utilize some services, which need IMSI instead of or in addition to MSISDN information as the IMSI information is not available in the operator's database dedicated to maintain and manage enterprise subscriptions. The situation as described may happen in the context of authentication services provided by the operator as the authentication is, at least with respect to some services, requiring the IMSI.

An example of such a situation is an access to a Wi-Fi network which uses EAP-SIM/AKA (Extensible Authentication Protocol—Subscriber Identity Module/Authentication and Key Agreement) method for access rights management. The EAP-SIM/AKA uses IMSI for authentication of the subscriber, which is transferred from the user terminal to the network. At one point of the authentication procedure the IMSI is compared to IMSI information stored in the operator's database dedicated to maintain and manage enterprise subscriptions receiving the maintenance information from an enterprise database. As a result, if the IMSI information does not exist in the operator database dedicated to maintain and manage enterprise subscriptions, the comparison produces mismatch of the compared information and service denial of the subscriber.

Thus, in order to provide all allowed services for a subscriber belonging to some enterprise subscriber space it needs to be confirmed that all necessary information is available in the operator database, which may be used in an authentication of a service.

SUMMARY OF THE INVENTION

An objective of the invention is to present a method, a network node and a system for managing subscriber related identifiers within a communication network. Another objective of the invention is that the method, the network node and the system enable a retrieval of the subscriber related identifier from a mobile communication network.

The objects of the invention are reached by a method, an apparatus and a computer program as defined by the respective independent claims.

According to a first aspect, a method for retrieving an identifier from a register residing in a mobile communication network is provided, wherein the identifier is mobile subscription specific. The method comprises recognizing, by a network node, a modification of information relating to a mobile subscription in a database; determining if the identifier with respect to the mobile subscription, whose information was modified, is missing; performing a query, in response to the determination of missing identifier, towards the register residing in the mobile communication network to request the missing identifier; receiving the missing identifier from the register; and delivering the received missing identifier to the database for storing in a context of the mobile subscription.

The recognition of modification of information by the network node may be based on at least one of the following: receiving a notification from the database, monitoring the status of information in the database.

The query towards the register may comprise a parameter representing the mobile subscription whose information was modified. The query towards the register may be performed with signaling in the mobile communication network. The query may be a MAP operation.

According to a second aspect, a network node comprising at least one processor, and at least one memory including portions of computer program code is provided wherein the at least one memory and the computer program code are configured to, with the at least one processor, cause the network node at least to perform the following steps: recognize a modification of information relating to a mobile subscription in a database, into which the network node has access; determine if the identifier with respect to the mobile subscription, whose information were was modified, is missing; perform a query, in response to the determination of missing identifier, towards the register residing in the mobile communication network to request the missing identifier; receive the missing identifier from the register; and deliver the received missing identifier to the database for storing in a context of the mobile subscription.

The network node may further be configured, during the recognition of modification of information, to perform at least one of the following: receive a notification from the database, monitor the status of information in the database.

The network node may be configured to insert a parameter representing the mobile subscription, whose information was modified, in the query. The parameter may be MSISDN.

The network node may be configured to perform the query towards the register with signaling in the mobile communication network. The network node may be configured to query the identifier with a MAP operation. The MAP operation may be sendRoutingInfo query.

The identifier received may be IMSI.

According to a third aspect, a system for retrieving an identifier from a register residing in a mobile communication network, wherein the identifier is mobile subscription specific is provide. The system comprises a database for maintaining information on at least one mobile subscription, a register comprising the identifier for each mobile subscriptions whose information is maintained in the register, and a network node. The network node within the system is configured to recognize a modification of information relating to a mobile subscription in a database; determine if the identifier with respect to the mobile subscription, whose information was modified, is missing; perform a query, in response to the determination of missing identifier, towards the register residing in the mobile communication network to request the missing identifier; receive the missing identifier from the register; deliver the received missing identifier to the database for storing in a context of the mobile subscription.

The database, the register and the network node may belong to a telecom operator entity.

The database may be configured to be modified by an external entity to the telecom operator entity.

The register may be one of the following: HLR, VLR, HSS.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION AND ITS ADVANTAGEOUS EMBODIMENTS

The invention relates to a management of authentication and authorization data within a telecom operator network element in order to provide comprehensive information for service access purposes when the access rights are at least partly checked from the telecom operator's data storage. More precisely, the invention relates to management of the authentication and authorization data of a mobile subscription in a situation, wherein a first party, such as enterprise representative, is capable of modifying user data comprising at least information on services the user is entitled to. The user data is identified with a first identifier, such as MSISDN, by the first party. Information on the modification to the user data is conveyed to data storage of a second party, like telecom operator, wherein the second party is managing access rights and requests to a certain service on the basis of the information stored in the data storage of the second party. In order to secure that the data storage of the second party comprises all possible authentication and authorization data relating to the subscription, which is available in the communications network of the second party, a functionality is arranged into a network element of the second party by means of which it is possible to recognize the first identifier relating to the user data and with that identifier it is possible to retrieve at least one second identifier relating to the subscription from at least one other network element accessible by the second party. The retrieved second identifier is configured to be stored in association with the authentication and authorization data of a subscription in the data storage of the second party.

Figures 1, 2:
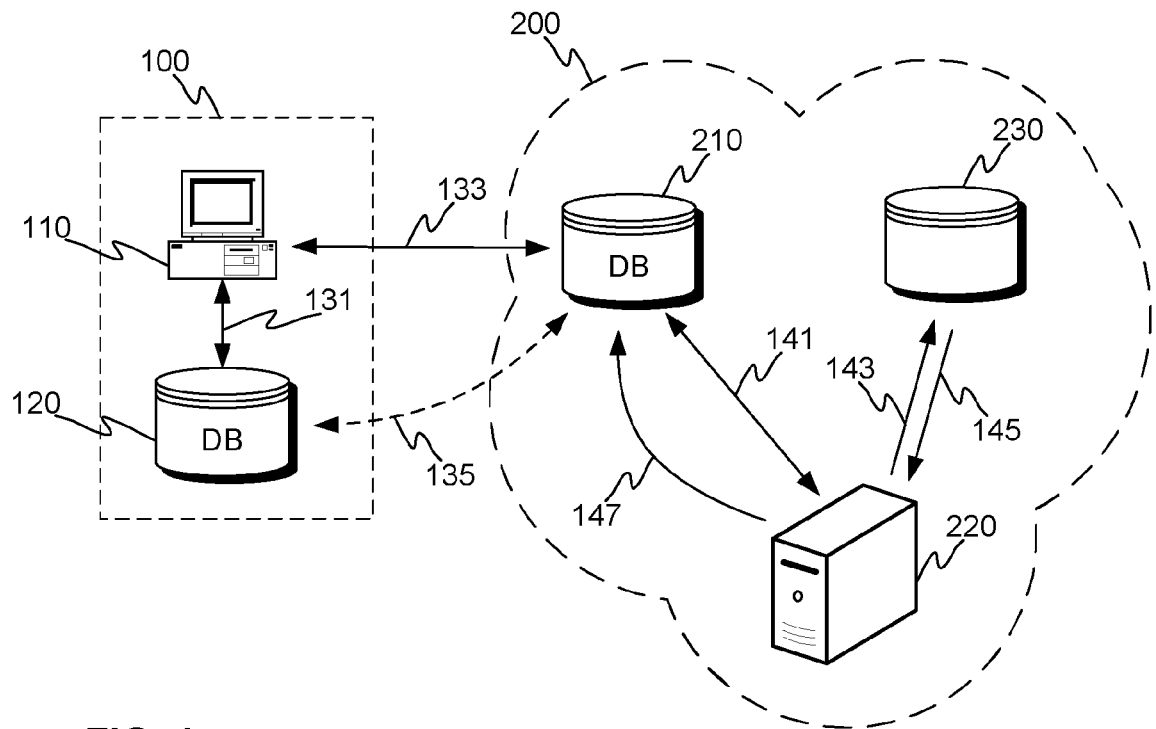
FIG. 1 illustrates a schematic illustration of the environment relating to the invention with the corresponding signaling.
FIG. 2 illustrates an example of a data structure in a database.

FIG. 1 discloses a schematic illustration on the environment relating to the invention as well as signaling between the different entities in order to establish the operation according to the invention. The environment comprises two entities. The first entity 100 is an enterprise domain and the second entity 200 is a telecom operator domain. The enterprise domain 100 may comprise an access terminal 110, such as a computing unit, by means of which a user may access external entities. The access terminal 110 may comprise a specific application by means of which it is possible to manage mobile subscriptions belonging to the enterprise. The access terminal 110 may be coupled either wirelessly or in a wired manner to the external entities. An external entity into which the access terminal 110 may be coupled to is an enterprise database 120 residing in the enterprise domain 100. The database may comprise information on the mobile subscriptions belonging to the enterprise, or more specifically, which are at least partly controlled by the enterprise. Another external entity into which the access terminal may be coupled to is an operator database 210 residing in the telecom operator domain. The operator database 210 comprises information on the mobile subscriptions. The mobile subscriptions may be categorized according to enterprise domains or in any other way in a data structure of the operator database 210. The operator database 210 shall be understood broadly. It can be dedicated to only one service, which is at least partly provided, or supported, by the operator, but which can be managed from the enterprise domain. Alternatively, the operator database may be dedicated to more than one service. For example, operator database may be utilized for Wi-Fi network authentication wherein the enterprise domain is managing the user, who are allowed to use the Wi-Fi network, but all the authentication tools are offered by the telecom operator. The operator may use IMSI in the authentication and thus it is not enough to manage the access rights on the basis of MSISDN, which is the only option for enterprise domain.

According to the method the enterprise representative may manage the mobile subscriptions belonging to the enterprise by means of an application installed in the access terminal. The application may specifically be designed for mobile subscription management within the access terminal 110 or it may provide access to the data relating to the mobile subscriptions residing in a database 120 and/or 210. At least any modification relating to a subscription data is configured to be transferred to at least one of the databases 120 or 210, or both to them by means of communication 131, 133 between the access terminal 110 and the database 120 and/or between the access terminal 110 and the database 210. Alternatively it may be arranged that the modification is first performed in the database 120 in the enterprise domain 100 and the modifications are configured to be copied to the database 210 residing in the operator domain 200 by arranging a communication 135 between the databases, or even vice versa. The copying may be performed either directly in response to any modification in the database 120, periodically according to a predetermined schedule or periodically with a random or semi-random schedule, for example. With respect to the management of the mobile subscription the subscription is identified by MSISDN as that is visible also for the enterprise representative. Thus, information relating to any modification of a mobile subscription is transferred to the operator database 210 with the MSISDN information. Naturally, each of the subscriptions may be managed with any other identifier, such as a username/password or alternate identifier, which is practical to use by enterprise representative.

As regards to the modification of a mobile subscription it is meant that the enterprise representative may modify some data relating to the mobile subscription. The data allowed to be modified by the enterprise representative may relate, for instance, to the user information of the mobile subscription (e.g. name of a user), rights to use some services available, activating or disabling subscriptions belonging to the enterprise or adjusting characteristics of the subscriptions, such as the size of data packet. However, the enterprise representative is not allowed to create new subscriptions, since it is only possible for the telecom operator. Users may have several terminal devices at disposal and enterprise representative may authorize and authenticate such secondary terminal devices tied to an existing mobile subscription. Now, as the information on the modification relating to a mobile subscription is delivered to the operator database 210 it is stored there on a basis of an identifier, such as MSISDN. The identifier may also be some other identifier, such as a username or similar, as long as the mobile subscription can be identified either directly or indirectly by means of the identifier. In order to recognize if the operator database 210 lacks of some information relating to the mobile subscription which could be needed with some services, a monitoring functionality is arranged in the operator domain 200. The monitoring function may be implemented in a network node 220, which is configured to monitor status of information in the operator database 210. The monitoring may be arranged by an exchange of information 141 between the network node 220 and operator database 210. The exchange of information 141 is advantageously achieved by any known communication techniques and protocols between the mentioned entities, such as TCP/IP. The monitoring may be achieved by arranging a periodic or aperiodic check-up of information by the network node 220 towards the database 210. If the check-up indicates that the database 210 contains of mobile subscription information lacking some predetermined information, some further functionalities may be pre-programmed in the network node 220. The predetermined information lacking in the database may, according to the invention, be some other identifier relating to the mobile subscription which is needed in at least some of the services available to the mobile subscription. An example of such an identifier is IMSI, but any other such as a username, password, any alternate identifier or even IPv6 address.

In some embodiment of the invention the monitoring can be achieved so that some intelligence is arranged in the database 210. In response to a receipt of information on a modification relating to a mobile subscription in the database 210 the operator database 210 is configured to indicate the received modification information to the network node 220. The indication may comprise at least some information relating to the mobile subscription in question, the information comprising at least identifier information regarding the mobile subscription, which is stored in the database 210. In such a case the network node 220 can be arranged to read the received indication from the operator database 210 and recognize if some information is missing. Alternatively, the indication may just show to the network node 220 that modification information is received in the database 210. The indication comprises advantageously at least one identifier, such as MSISDN, for the modified mobile subscription. Then, the network node 220 may be arranged to initiate an inquiry to the database 210 in order to receive detailed information on at least predetermined data entries relating to a mobile subscription, whose information was modified.

Next, as the network node 220 has received, or has access to, information on the mobile subscription data, which is modified, the network node 220 is arranged to determine if the mobile subscription data comprises all necessary information with respect to at least some services available for the mobile subscription in question. More specifically, the network node 220 may be configured to determine if the mobile subscription data comprise all necessary identifiers for the mobile subscription which may be needed in some services, especially for authentication. In some context such an identifier is IMSI. If the determination indicates that there does not exist at least one other identifier for the mobile subscription in the operator database 220, wherein the at least one other identifier is available as such for the telecom operator, the network node 220 is arranged to compose a query 143 in order to receive the missing at least one identifier from a communication network register 230. The query comprises at least the known identifier i.e. MSISDN. According to the invention the query composed is configured to be such that it complies with signaling in the communications network. The query as described may be a MAP (Mobile Application Part) operation request according to SS7 (Signaling System No. 7). An example of such a signaling is a "sendRoutingInfo for SM" which comprises the MSISDN of the mobile subscription as a parameter in order to retrieve some further information relating to the subscription. The query is delivered to the communication network register 230, such as HLR (Home Location Register) or HSS (Home Subscriber Server). In some implementations of the invention the query may be delivered to VLR (Visitor Location Register) since the information maintained in the VLR is at least partly originated from a corresponding HLR. The communication network register 230 retrieves information relating to the mobile subscription on the basis of the first identifier, such as MSISDN, and returns 145 at least one other identifier, such as IMSI, as a response to the query 143. The network node 220 is configured to receive the response and deliver 147 the received additional identifier to the operator database 210 for storing. The received additional identifier, such as IMSI, is advantageously delivered to the operator database 210 with the MSISDN information in order to store the received additional identifier in a correct way into the database 210. Additionally, the network node 220 may also store the received identifier either temporarily or permanently. The network node may also be arranged to maintain information on the modified mobile subscriptions in the operator database 210 and/or the queries sent to the communications register 230. The maintenance on the mentioned information may be performed either temporarily or permanently.

Above it is described that the query is specifically "sendRoutingInfo" query, but it can be any other similar query by means of which the necessary missing identifier may be retrieved from the register 230. The advantage in using "sendRoutingInfo" query is that it can be applied even in situations in which there are mobile subscriptions from multiple telecom operators. The use of "sendRoutingInfo" is allowed between the telecom operators, i.e. even if one telecom operator is offering a service to the enterprise, the required information in order to use the service may be received also from other operators for storing the information in the operator database 210. In practice, it is possible to arrange a procedure by means of which the identifier query can be directed to a correct operator register. Namely, it is possible to analyze the MSISDN number, which may indicate the operator whose subscription is in question, and on the basis of the analysis direct the query correctly. Furthermore, in an environment where the phone number portability is allowed, i.e. the MSISDN number is independent on the operator serving the customer, it is possible to arrange a lookup operation by means of which it is first queried from a database comprising a data structure revealing, which operator is service which MSISDN number. In response to the receipt of the information the digits in the MSISDN representing the operator identifier are replaced with operator identifier representing the real serving operator. As a result, the original identifier query may be directed to a correct operator.

When the missing information is stored in the operator database 210 it is possible to serve the mobile subscription within the limits as defined for the mobile subscription in question. In practice this means that the mobile subscription may utilize services in which the identifier as retrieved from the communication network register 230 is needed.

FIG. 2 illustrates an example of a data structure maintained in the operator database 210 with respect to mobile subscriptions belonging to a certain enterprise. The data structure may comprise a first identifier for each of the mobile subscriptions MSISDN1-MSISDNn belonging to the control of the enterprise. Furthermore, the data structure may comprise at least one other identifier field IMSI, which is configured to maintain identifiers IMSI1-IMSIn corresponding to the first identifiers MSISDN1-MSISDNn. The at least one other identifier field is not visible to the enterprise, but only within the operator network. In other words, the enterprise representatives do not have access to modify the field. Further, the data structure advantageously comprises information on the services SERVICE1-SERVICEn provided for each of the mobile subscriptions. Herein the service available for a mobile subscription is marked with a symbol "+" and the service not available with a symbol "−". The enterprise representatives may have access to modify the service rights for a mobile subscription through the access terminal 110. According to the fictitious setup as illustrated in FIG. 2 the data structure is lacking IMSI information on the mobile subscription of MSISDN2. Even if MSISDN2 is allowed to use all the services SERVICE1-SERVICEn, it may happen that at least one of the services cannot be used as the IMSI is needed for the service. Thus, according to the invention the network node 220 is configured to monitor the status of the data structure as described and recognize if information on at least one other identifier is lacking in the data structure. It may be arranged that the monitoring is specifically focused to some columns in the data structure, such as column IMSI in FIG. 2. When it is recognized that IMSI information is lacking for the MSISDN2, the functionality of retrieval the information may be initiated as described. The retrieved information is then stored in the data structure by the network node 220. As said, it may also be arranged so that the operator database 210 comprises a functionality to inform the network node 220 on the missing information as described above. Even if the data structure in FIG. 2 illustrates services SERVICE1-SERVICEn as independent elements, it may also be arranged so that each of the columns refers to different sets of services, which are allowed for the mobile subscription.

According to an embodiment of the invention it may be arranged that if the data structure is modified and that is recognized by the network node 220, the network node 220 is configured to check the existence of all the IMSIs in the data structure. Alternatively or in addition, the network node may be configured to retrieve the IMSIs for all or for some of the mobile subscriptions in the data structure. In this manner information on the data structure is always confirmed by the system.

Figure 3:
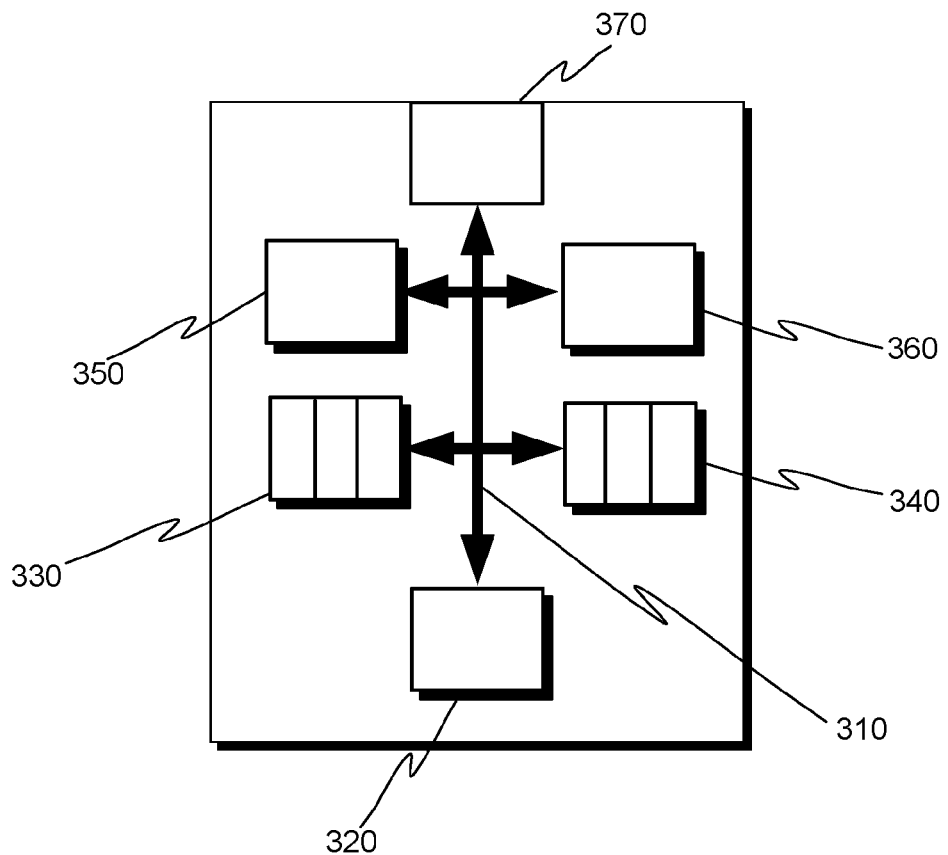
FIG. 3 illustrates an exemplary diagram of a network node according to the invention.

FIG. 3 is an exemplary diagram of a network node according to an implementation consistent with the principles of the invention. The network node comprises a bus 310, a processor 320, a random access memory (RAM) 330, a read only memory (ROM) 340, input means 350, output means 360, and a communication interface 370. The bus 310 may include means or methods that enable communication among the elements of the network node.

The processor 320 may comprise one or more conventional processors, one or more microprocessors, or one or more processing logics, or any combination of these, that interprets and executes instructions defined by portions of computer program code. The random access memory 330 may store information and instructions for execution by the processor 320. The ROM 340 may include a conventional ROM device or another type of a static storage device that is configured to store static information and instructions for use by the processor 320. The RAM and ROM may be implemented with one or more corresponding memory elements.

The input means 350 may comprise a conventional mechanism that permits a user to input information to the network node, such as a keyboard, a mouse, a pen, a touch screen, voice recognition and/or biometric mechanisms, etc. The output means 360 may comprise a conventional mechanism that outputs information to the user, including a display, a printer, a speaker, etc. The communication interface 370 enables the network node to communicate with other nodes and/or systems over a network. For example, the communication interface 370 may comprise mechanisms for communicating with external entities such as networks and network elements, such as databases and registers.

The network node may perform the operations as described above in response to the processor 320 executing at least one portion of instructions defined in portions of computer program code contained in the computer-readable medium, such as memory. A computer-readable medium may be defined as a physical or logical memory device. The software instructions may be read into the memory from another computer-readable medium, such as a data storage device, or from another device via the communication interface 370. The software instructions may cause the processor 320 to perform method steps and processes as described.

A system according to the invention comprises operator database 210 for storing information relating to mobile subscriptions belonging under control of an enterprise. Further, the system comprises a network node 220 for monitoring the information status in the database 210 and recognizing if some information, such as an identifier like IMSI, is missing. In response to the recognition of the missing information the system is configured, by the network node 220, to create and deliver, i.e. perform, a query to a register in order to receive the missing information. The system further comprises a mechanism to receive the missing information in the network node 220 and return and store it in the database 210.

Even if FIG. 1 and the corresponding description represent that the operator database 210 and the network node 220 are separate entities, it may be arranged that they are integrated into the same entity. The necessary communication between the data structure and the functionality according to the invention may be arranged in the integrated entity by utilizing typical computer call functions.

Some embodiment of the invention may allow a modification of mobile subscription data directly in the database 210 by an enterprise representative. This may be achieved with an application installed in the access terminal 110, which is configured to establish a communication channel to the database 210 and allow modification to at least part of the data stored in the database 210.

The term "modification" shall be understood broadly in this context. It covers at least the following: changing values in the data structure, creating new values or data entries in the data structure and replacing values in the data structure, or any combination of these.

Figure 4:
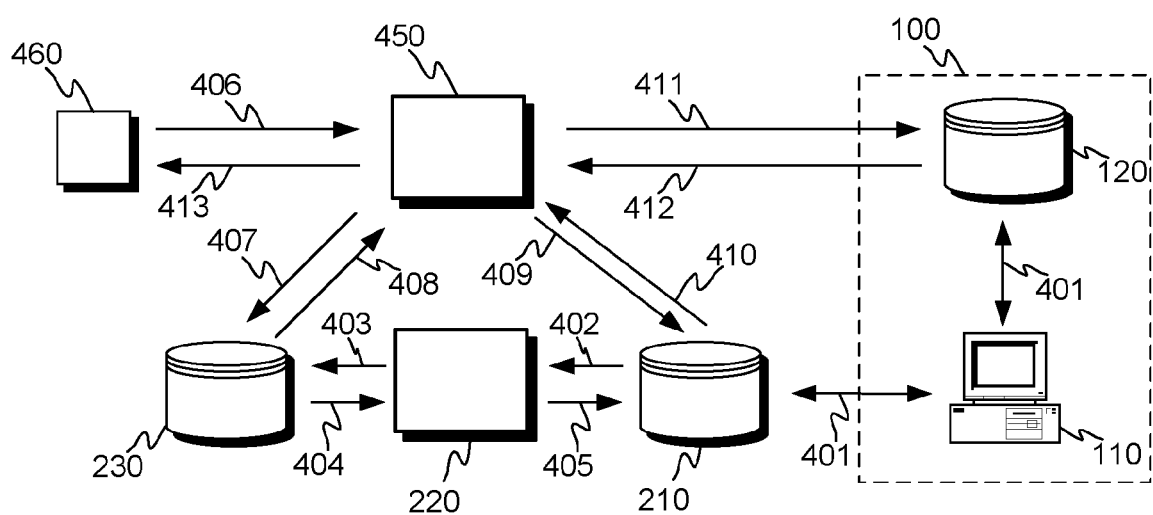
FIG. 4 illustrates an example of an application of the invention.

Next it is described an example of a use case by referring to FIG. 4. The use case relates to allowing an enterprise database access via Wi-Fi for a mobile terminal wherein the access to both the database and the Wi-Fi network are limited. The same reference numbers are used with the corresponding elements as in FIG. 1. The steps according to the use case (arrows in FIG. 4) are referred with reference numbers 401-413. The mentioned steps are as follows:

401. Enterprise adds MSISDN, or modifies rights relating to the MSISDN, to their own database 120 and to operator database 210 by means of an access terminal 110.
402. MSISDN information, or modification, is transferred from the operator database 210 to a network node 220.
403. A functionality in the network node 220 inserts MSISDN to the MAP operation request, e.g. sendRoutingInfo for SM (Short Message) and sends it to the HLR 230.
404. HLR responses to sendRoutingInfo for SM returning the IMSI related to MSISDN.
405. The network element 220 forwards the IMSI to operator database 210 and it is added to the user of the MSISDN. At the same time user-name and password are generated for the user in a situation where a service is based on the username and password among other details. Username can be MSISDN.
406. User is authenticating to Wi-Fi using EAP-SIM/AKA. Identity is IMSI in the authentication and in the later phase TMSI.
407. AAA (Authentication, Authorization, and Accounting) server 450 is authenticating user towards HLR 230.
408. HLR 230 responses.
409. If the authentication is OK, AAA Server 450 sends IMSI to operator database 210 to map IMSI to MSISDN.
410. Operator database 210 returns MSISDN to AAA server 450.
411. AAA Server 450 authorizes user to the enterprise database 120 using MSISDN.
412. Enterprise database 120 answers to AAA Server 450.
413. If authentication and authorization are OK, then the user is given an access to the enterprise services according to policy received from the enterprise database 120.

As said the use case as described is an example and does not anyhow limit the inventive idea as described.

Some advantageous embodiments according to the invention were described above. The invention is not limited to the embodiments described. The inventive idea can be applied in numerous ways within the scope defined by the claims attached hereto.

The invention claimed is:

1. A method for retrieving an identifier from a register residing in a mobile communication network, wherein the identifier is mobile subscription specific, the method comprising the steps of:
   recognizing, by a network node, a modification of information relating to a mobile subscription in an operator database,
   determining if the identifier with respect to the mobile subscription, whose information was modified, is missing,
   performing a query, in response to the determination of missing identifier, towards the register residing in the mobile communication network to request the missing identifier,
   receiving the missing identifier from the register, and
   delivering the received missing identifier to the operator database for storing in a context of the mobile subscription.

2. The method of claim 1, wherein the recognition of modification of information by the network node is based on at least one of the following: receiving a notification from the operator database, monitoring the status of information in the operator database.

3. The method of claim 1, wherein the query towards the register comprises a parameter representing the mobile subscription whose information was modified.

4. The method of claim 3, wherein the query towards the register is performed with signaling in the mobile communication network.

5. The method of claim 4, wherein the query is a MAP operation.

6. A network node comprising
   at least one processor, and
   at least one memory including portions of computer program code wherein the at least one memory and the computer program code configured to, with the at least one processor, cause the network node at least to perform:
recognize a modification of information relating to a mobile subscription in an operator database, into which the network node has access,
determine if the identifier with respect to the mobile subscription, whose information were was modified, is missing,
perform a query, in response to the determination of missing identifier, towards the register residing in the mobile communication network to request the missing identifier,
receive the missing identifier from the register, and
deliver the received missing identifier to the operator database for storing in a context of the mobile subscription.

7. The network node of claim 6, wherein the network node is configured, during the recognition of modification of information, to perform at least one of the following: receive a notification from the operator database, monitor the status of information in the operator database.

8. The network node of claim 6, wherein the network node is configured to insert a parameter representing the mobile subscription whose information was modified in the query.

9. The network node of claim 8, wherein the parameter is MSISDN.

10. The network node of claim 6, wherein the network node is configured to perform the query towards the register with signaling in the mobile communication network.

11. The network node of claim 10, wherein the network node is configured to query the identifier with a MAP operation.

12. The network node of claim 11, wherein the MAP operation is sendRoutingInfo query.

13. The network node of claim 6, wherein the identifier received is IMSI.

14. A system for retrieving an identifier from a register residing in a mobile communication network, wherein the identifier is mobile subscription specific, the system comprising:
an operator database for maintaining information on at least one mobile subscription,
a register comprising the identifier for each mobile subscriptions whose information is maintained in the register, and
a network node configured to
recognize a modification of information relating to a mobile subscription in the operator database,
determine if the identifier with respect to the mobile subscription, whose information was modified, is missing,
perform a query, in response to the determination of missing identifier, towards the register residing in the mobile communication network to request the missing identifier,
receive the missing identifier from the register, and
deliver the received missing identifier to the operator database for storing in a context of the mobile subscription.

15. The system of claim 14, wherein the operator database, the register and the network node belong to a telecom operator entity.

16. A system according to claim 14, characterized in that the operator database (210) is configured to be modified by an external entity to the telecom operator entity.

17. The system of claim 14, wherein the register is one of the following: HLR, VLR, HSS.

* * * * *